United States Patent [19]

Mullaney

[11] 3,764,148
[45] Oct. 9, 1973

[54] ROTARY MECHANICAL FLUID SEAL
[75] Inventor: John J. Mullaney, Warwick, R.I.
[73] Assignee: Sealol, Inc., Warwick, R.I.
[22] Filed: Jan. 26, 1972
[21] Appl. No.: 220,734

[52] U.S. Cl. ............................................. 277/40
[51] Int. Cl. ............................................. F16j 15/34
[58] Field of Search ................. 277/39, 40, 41, 42, 277/43, 81, 87

[56] References Cited
UNITED STATES PATENTS
| 2,077,881 | 4/1937 | Gits | 277/40 |
| 2,444,714 | 7/1948 | Voytech | 277/40 |
| 3,026,114 | 3/1962 | Andresen et al. | 277/40 |
| 3,592,479 | 7/1971 | Andresen | 277/40 |

Primary Examiner—George E. Lowrance
Assistant Examiner—Robert I. Smith
Attorney—Ralph L. Cadwallader and Leo M. Kelly

[57] ABSTRACT

A rotary mechanical fluid seal for use in high pressure and/or high temperature environments, comprising a unitary structure adapted to cooperate with a rotating member and consisting of a cup having an inner shell with a shaft opening, a primary sealing ring having a sealing face engageable with a rotating member and slidably mounted in said housing, a secondary sealing element, fabricated from semi-resilient material, slidably engaging said primary sealing ring in fluid tight relationship and slidably engaging the inner shell or shaft in fluid tight relationship.

3 Claims, 6 Drawing Figures

ROTARY MECHANICAL FLUID SEAL

The present invention is concerned with rotary mechanical fluid seals of the type used for effecting a fluid tight seal between a rotating mating ring and a non-rotating sealing face, and more particularly with the secondary sealing element used to separate the high pressure chamber from the low pressure chamber.

An object of the present invention is to provide a secondary sealing element in a rotary mechanical fluid seal which will effectively function in extremely high temperatures.

Another object of the present invention is to provide a rotary mechanical fluid seal with novel structural features, so that the several parts may be assembled from parts fabricated from a variety of materials, and in this manner, the seal will function in a wide variety of fluid environments.

Still another object of the present invention is to provide a rotary fluid seal for use with very high fluid pressure, be the fluid liquid or gas, which is economical to manufacture, yet durable and reliable in use.

And still another object of the present invention is to provide a shaft seal for a rotating shaft, a sliding shaft and/or an oscillating shaft which inherently provides a very low frictional drag force on the shaft while providing reliable fluid tight integrity in a wide range of temperatures and fluid pressure environments.

In environments where fluids are pumped or otherwise circulated it has long been a practice to seal the rotary shaft, which is a part of the pumping or circulating apparatus, by utilizing a mechanical seal.

Commonly, the shaft extends from the zone of the fluid to a zone outwardly therefrom in the atmosphere and for rather obvious reasons, excessive fluid flow across the shaft from the fluid zone to the atmospheric zone is undesirable.

The aforementioned mechanical seals, conventionally, take the form of a rotary member supported on the rotating shaft. The rotary member being provided with a mating face. The rotary member being one of the interfaces which form a fluid tight joint between a stationary element and the rotating member.

The stationary element is normally fixed in the pump housing and is provided with a secondary sealing element which forms a fluid tight joint between the rotating shaft and the stationary element. The present invention is directed to the secondary sealing element.

In the past this secondary sealing element took the form of an "O" ring, or other packing, frictionally gripping other elements to provide fluid tight integrity.

With the advent of high temperatures above 500°F and high pressures above 500 pounds per square inch, the material of which the "0" ring was fabricated either disintegrated or created a condition of high hysteresis or a great frictional drag force.

Accordingly, it is an object of the present invention to provide a secondary and/or primary sealing element which will increase sealing efficiency as the environmental temperature and/or pressure increases and function effectively at ambient pump starting temperatures on shafts which rotate, slide or oscillate.

Other objects of the present invention will be pointed out in part and become apparent in part in the following specification and claims.

Like reference numerals refer to like parts in the accompanying drawings in which.

Figures 1, 2:
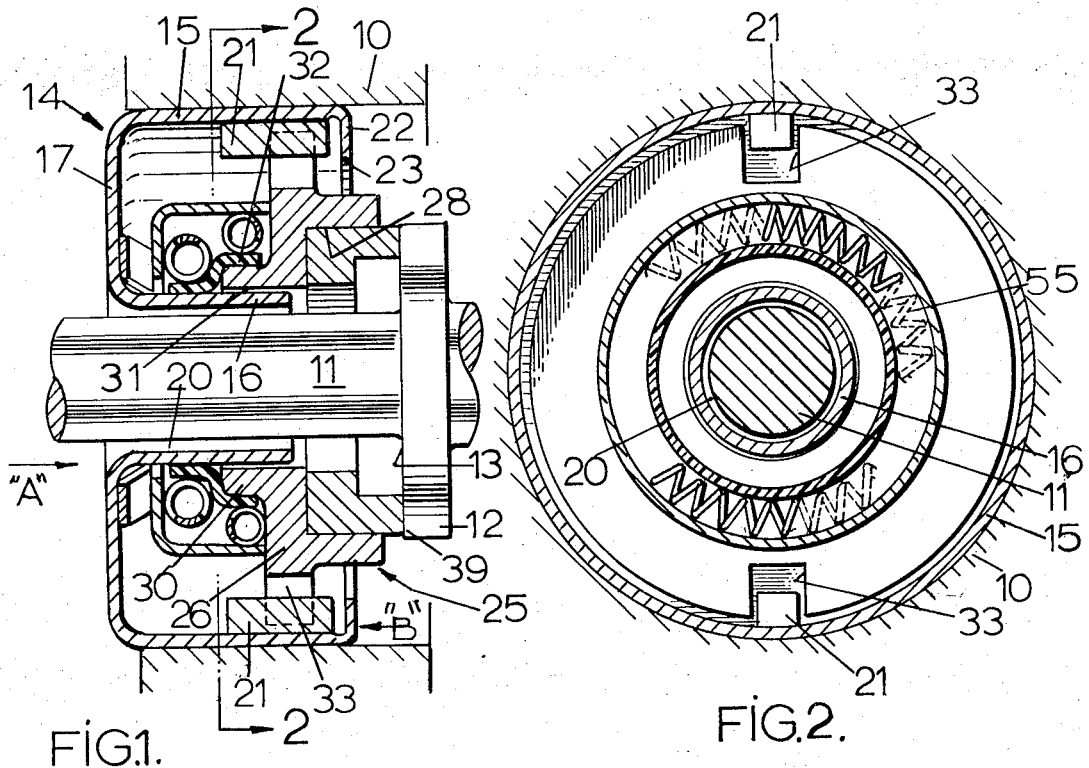
FIG. 1 is a vertical cross sectional view of the new and improved rotary mechanical fluid seal adapted to be fixed in a housing.
FIG. 2 is a vertical cross sectional view taken on line 2—2 of FIG. 1.
Figure 3:
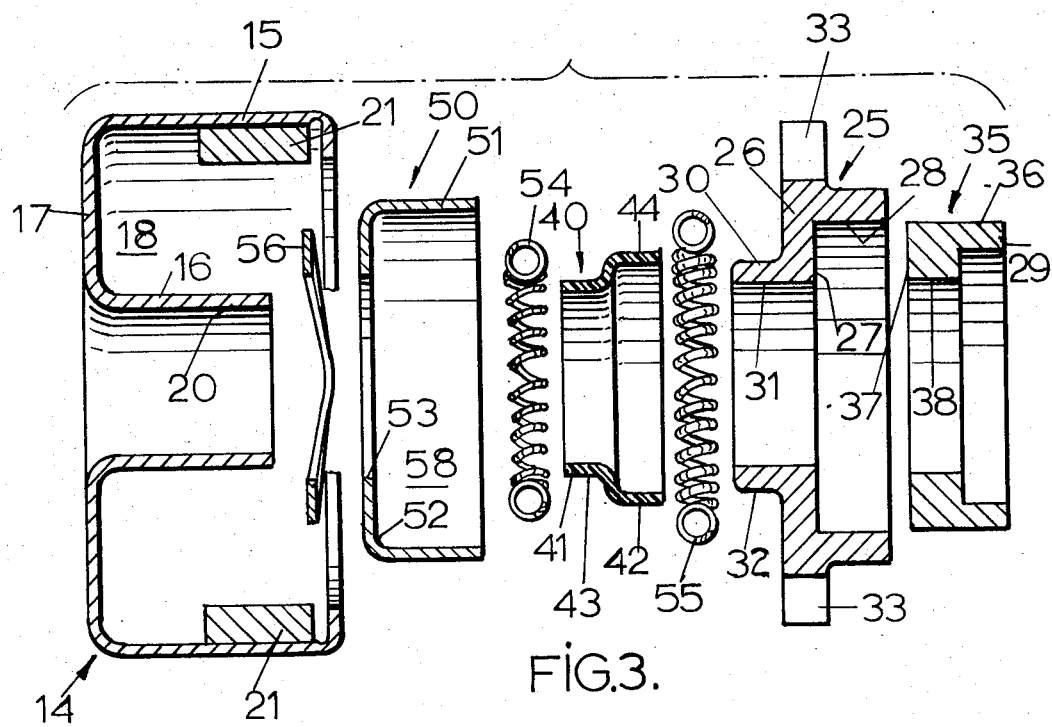
FIG. 3 is an exploded perspective view of the seal construction shown in FIG. 1.

In proceeding with this invention, reference is directed to FIGS. 1, 2 and 3 of the drawings, wherein is illustrated the new and improved rotary mechanical fluid seal, supported in a pump housing 10 and surrounding a pump shaft 11. The shaft 11 may be provided with a circular flange 12 serving the function of a mating ring having a mating face 13 which is one of the two interfaces.

The unitary seal structure comprises a cup, generally indicated by reference numeral 14, consisting of an outershell 15, an inner shell 16 and a back wall 17 integrally connected to both the outer shell 15 and inner shell 16 to provide a chamber 18. Inner shell 16 forms a shaft opening 20 through which shaft 11 freely passes.

One or more keys 21, shown as two in number, are welded to outer shell 15 and project into chamber 18. Outer shell 15 may be provided with an integrally connected lip 22 having an opening 23 leading to chamber 18.

A primary sealing ring, generally indicated by reference numeral 25, comprises a circular disk body 26 provided with a circular recess having a base 27 and an inner wall 28. Body 26 is also provided with a circular collar 30 having a central shaft or inner shell opening 31 and a circular sealing seat 32. Body 26 has two keyways 33 adapted to accommodate keys 21.

A sealing ring insert generally indicated by reference numeral 35, is provided with an outside surface 36, a rear wall 37, a clearance orifice 38, and a sealing face 39 which forms the other of the two interfaces. Sealing ring 35 is press fitted into the circular recess with rear wall 37 abutting base 27 and with outside surface 36 engaging inner wall 28 to be thereby retained within said recess. The area of sealing face 40 is variable to accommodate different pressure environments.

The secondary sealing element, generally indicated by reference numeral 40 comprises a hollow gland having a lower step 41 and an integral upper step 42. Lower step 41 is provided with lower sealing surface 43. Upper step 42 is provided with upper sealing surface 44. Secondary sealing element 40 is fabricated from a resine compound composed of fluorine and carbon such as polytetrafluoroethylene or fluorinated ethylenepropylene which are substances that will function effectively in temperatures up 500°F and pressures in excess of 500 pounds per square inch.

Any plastic material or polymer which is semi-resilient, which can operate in environmental temperatures up to 500°F, has a low coefficient of friction and which lacks the high degree of elasticity or memory of rubber and which has a higher coefficient of expansion over the material forming the parts which combine to form a fluid tight seal, will suffice.

A retainer, generally indicated by reference numeral 50, comprises an outer wall 51, a rear wall 52, integrally connected said outer wall 51, and provided with an axial opening 53. Outer wall 51 and rear wall 52 form a cavity 58.

Two garter springs 54, 55 and a wavy washer spring 56 are provided for purposes which will presently appear.

In assembling the several parts, a unitary structure is provided by inserting wavy washer spring 56 into chamber 18 and against the inside surface of back wall 17 over inner shell 16. Retainer 51 is then passed over inner shell 16 and against wavy spring 56. Secondary sealing element 40 is passed into cavity 58 with lower step 41 engaging inner shell 16. Garter spring 54 is then fastened around lower step 41 to resiliently hold lower step 41 against inner shell 16. Garter spring 55 is then fastened around upper step 42. Since the material comprising secondary sealing element 40 is semi-resilient; the constriction force of garter spring 55 is not sufficient to collapse upper step 42, which still retains a circular shape.

The sealing ring insert 35 may be fabricated from innumerable materials, metal, plastic or carbon. The nature of the fluid to be sealed determines the material to be used for the sealing ring insert 35.

With the sealing ring insert 35 housed in primary sealing ring 25, as previously described, sealing ring 25 is aligned with keys 21 through keyways 33 and passed into chamber 18 with sealing seat 32 projecting into cavity 58 with inner shell opening 31 surrounding inner shell 16 and with sealing seat 32 engaging upper sealing surface 44. A unitary seal structure is thereby provided. This unitary structure may now be fastened in a pump housing 10 over a pump shaft 11 with sealing face 39 yieldingly engaging mating face 13 through the action of wavy washer spring 56 interposed between back wall 17 and rear wall 52. Rear wall 52 also prevents spring 54 from being displaced from position on step 41. Outer wall 51 aids in preventing spring 55 from becoming displaced from step 44.

Fluid flowing in the direction of arrow "A", for example, will flow along the outside surface of shaft 11 and inner shell 16 to be blocked at inner faces 13 and 39 forming a primary fluid tight seal. Fluid, however, will flow between inner shell 16 and inner shell opening 31 to flow into chamber 18. Lower step 41 engaging inner shell 16 and upper step 42 engaging sealing seat 32 will prevent the flow of fluid beyond the respective fluid seal positions. Thus a secondary fluid seal is provided: Wherein the expansion of secondary sealing element 50 does not impair sealing efficiency.

Should fluid flow from the direction of arrow "B", the same primary and secondary sealing conditions would prevail.

However, fluid flowing into cavity 58 through axial opening 53 would exert pressure upon steps 41, 44 to assist the forces of springs 54, 55, respectively, to make steps 41, 44 fluid tight.

Figure 4:
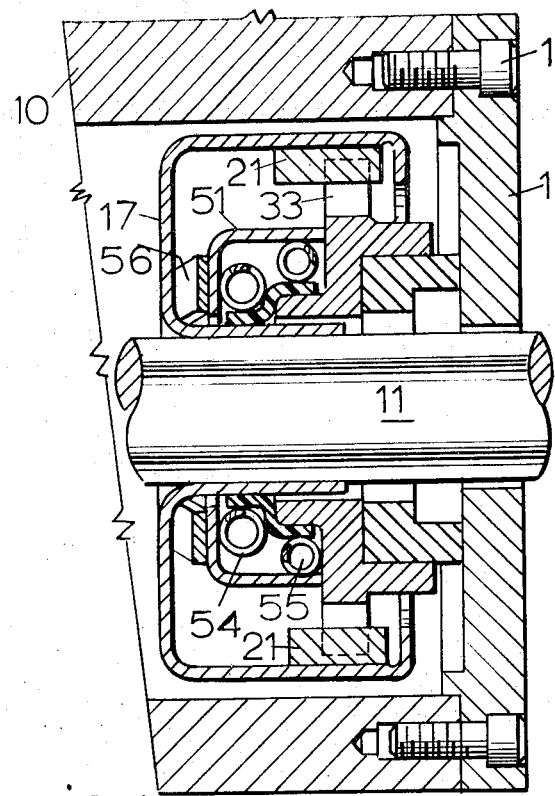
FIG. 4 is a view similar to FIG. 1 showing a modified form of construction.

Reference is now made to FIGS. 1 and 4. In FIG. 1 the mating ring 12 is fastened to the shaft 11 and rotates with the shaft. The unitary sealing structure is fastened in the housing 10 and is therefore non-rotating.

In FIG. 4 the unitary structure is identical in construction to that described with reference to FIG. 1. The difference is that inner shell 16 is fastened to shaft 11 to thereby rotate the unitary structure while the flange 12 of FIG. 1 becomes flange 12 A in FIG. 4 and is fastened to housing 10 as by means of screws 12 B and is the non-rotating element.

Figure 5:
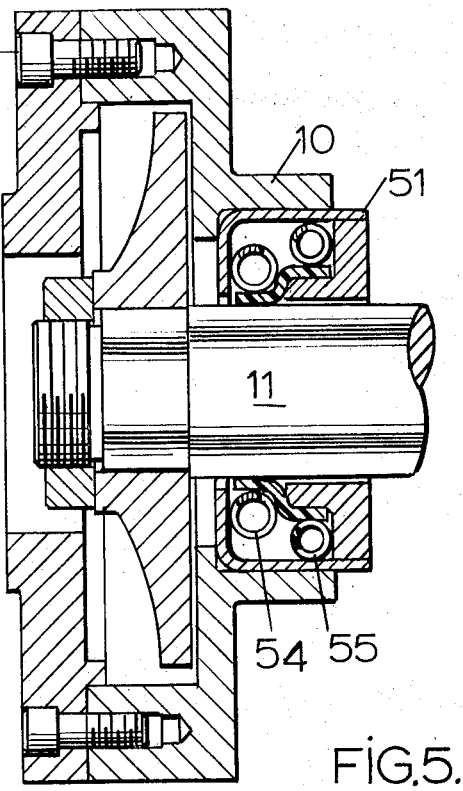
FIG. 5 is a vertical cross sectional view showing the new and improved secondary seal in use as a primary fluid seal.

FIG. 5 illustrates the secondary sealing element of FIG. 1 as a primary sealing element fastened in a housing 10 with lower step 41 in direct contact with a pump shaft 11.

Figure 6:
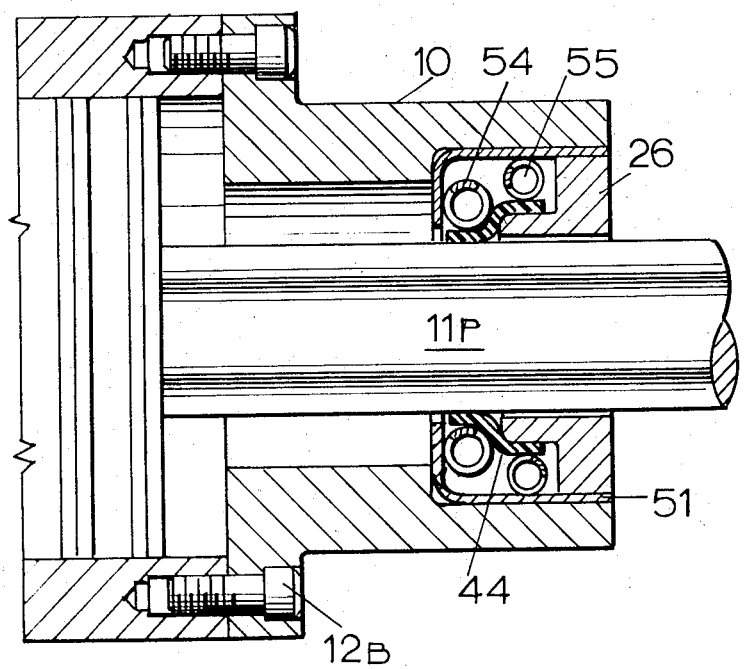
FIG. 6 is a view similar to FIG. 5 showing a modified use of the structure illustrated in FIG. 5.

FIG. 6 illustrates the same primary sealing element of FIG. 5 as applied to a reciprocating shaft 11 A of a piston.

Having shown and described preferred embodiments of the present invention, by way of example, it should be realized that structural changes could be made and other examples given without departing from either the spirit or scope of this invention.

What I claim is:

1. A rotary mechanical fluid seal unitary structure comprising a cup consisting of an outer shell and inner shell to provide a chamber, said inner shell having a shaft opening, a key fastened to said outer shell and projecting into said chamber, a primary sealing ring consisting of a circular disk body provided with a circular collar having an inner shell opening, a circular sealing seat, a sealing face and a keyway adapted to engage said key located within said chamber with said sealing face projecting beyond said chamber, a secondary sealing element comprising a hollow gland having a lower step and an integral upper step, said lower step having a lower sealing surface, said upper step having an upper sealing surface, said upper sealing surface engaging said circular collar, resilient means yieldingly urging said upper sealing surface against said circular collar, said lower sealing surface engaging said inner shell, means yieldingly urging said lower sealing surface against said inner shell, a retainer comprising an outer wall, a rear wall integrally connected to said outer wall and provided with an axial opening to accommodate said inner shell, said outer wall and rear wall forming a cavity, said cavity housing said secondary sealing element, and resilient means interposed between said back wall and said rear wall to yieldingly urge said sealing face beyond said chamber.

2. A rotary mechanical fluid seal according to claim 1 in which said secondary sealing element is fabricated from a resine compound composed of fluorine and carbon such as polytetrafluoroethylene or fluorinated ethylenepropylene.

3. A fluid seal comprising a retainer having an outer wall, a rear wall integrally connected to said outer wall and provided with an axial opening, said outer wall and rear wall forming a cavity, a sealing element comprising a hollow gland fabricated from semi-resilient material and having a lower step and an integral upper step, said lower step having a lower sealing surface, said upper step having an upper sealing surface, a ring consisting of a circular disk body provided with a circular collar having a central shaft opening, a circular sealing seat located on the outside surface of said circular collar, said upper sealing surface engaging said circular sealing seat, said sealing ring and said hollow gland located within said cavity, a first garter spring located around said lower step to provide a yielding constrictive force, a second garter spring located around said upper step to provide a yielding constrictive force, to thereby provide a unitary sealing structure about a shaft when said lower step is in engagement with a shaft.

* * * * *